Aug. 25, 1964　　　A. G. BODINE　　　3,145,467
METHOD OF MAKING SHAFT JOINT
Original Filed Aug. 19, 1957
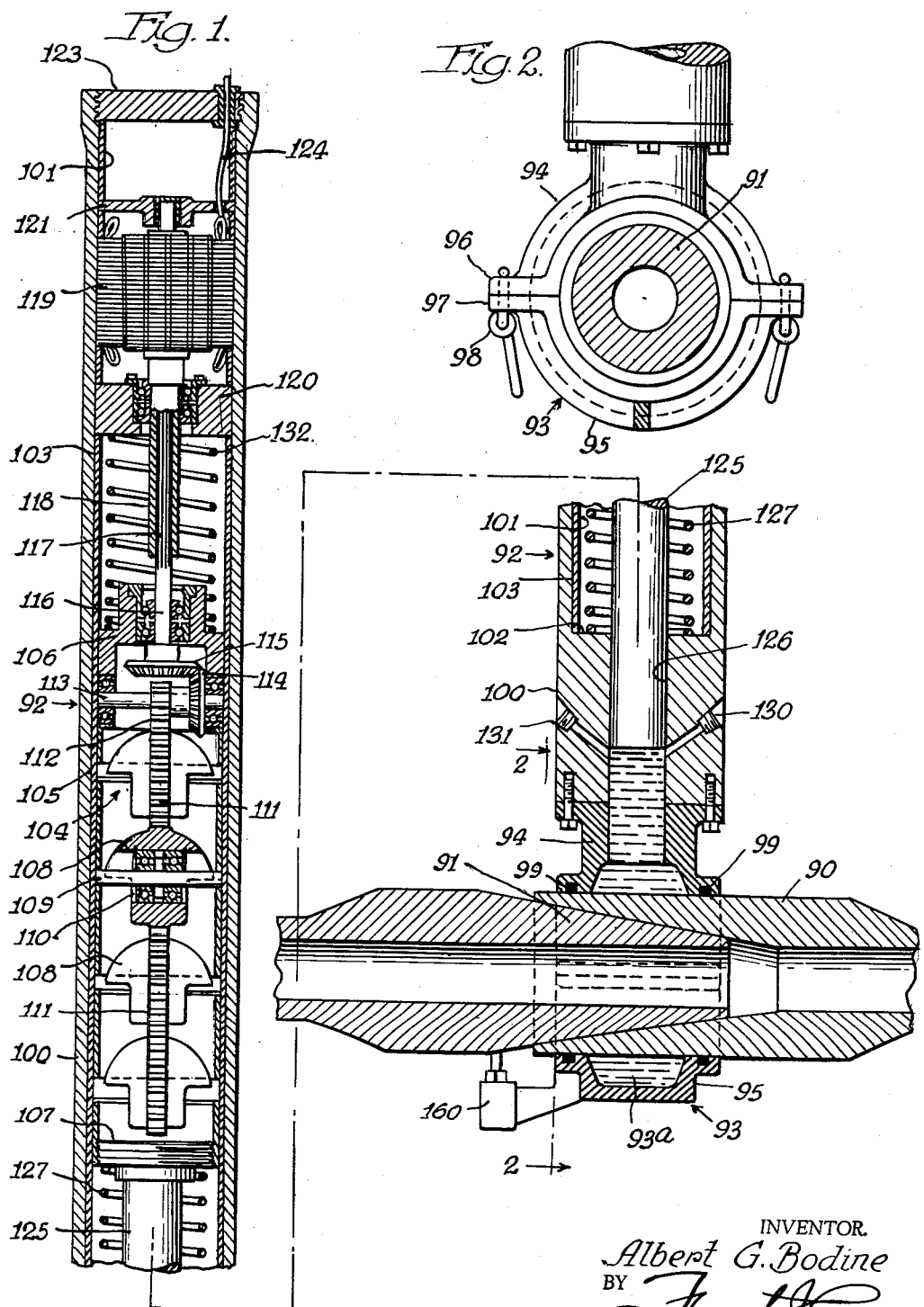
INVENTOR.
Albert G. Bodine
BY
Attorney

United States Patent Office 3,145,467
Patented Aug. 25, 1964

3,145,467
METHOD OF MAKING SHAFT JOINT
Albert G. Bodine, Sherman Oaks, Calif.
(7877 Woodley Ave., Van Nuys, Calif.)
Original application Aug. 19, 1957, Ser. No. 678,905, now Patent No. 3,063,143, dated Nov. 13, 1962. Divided and this application Mar. 16, 1962, Ser. No. 180,290
1 Claim. (Cl. 29—525)

This invention is concerned with a method of making threadless joints for long transmission shafting, such as, but not limited to, joints employed in oil well drilling string. The invention is also applicable to other types of shafting such as long transmission shafts employed in factories and mines for delivering rotating power to various machines.

Most shaft joints employ some type of screw thread, typically in the form of a single large thread like a pipe thread. Thus, in a so-called drill pipe tool joint, a taper threaded "pin" is screwed into a taper threaded socket or "box." As a second familiar example may be mentioned shaft flanges secured by nuts and bolts. Threaded structures, however, are very fatigue sensitive, especially if the threads are subject to wear owing to repeated making and unmaking of the joint.

A primary object of the present invention is accordingly the provision of a novel and improved method of making threadless taper shaft joint.

Broadly speaking the invention is of that class of making box and pin joints by employing methods of swelling momentarily the box or socket member of the joint while the pin member is inserted or removed therefrom, and a more particular object of the invention is to accomplish this result without resort to heating, but by application to vibratory force. These objects are attained, in the present invention, by subjecting the exterior of the box coupling member to alternating dilational and contractive impulses, causing the box member alternately to elastically dilate and contract, while at the same time forcing the tapered pin coupling member into the box. Preferably, and illustratively, the box coupling member is surrounded by a liquid body, and a vibration generating means is utilized to produce compressional wave action in this liquid body. This wave action, which consists of alternating compressions and rarefactions, is transmitted to the exterior of the box coupling member, and sets the latter into alternating dilational and contractive elastic vibration. Thus the box coupling member periodically elastically expands, and so permits the taper pin coupling member to be driven deeper into it. When the vibration is terminated, the box member is left in an elastically expanded condition (within its elastic limit) and so grips the pin with high stress.

The invention will be better understood from the following detailed description of a present embodiment thereof, reference for this purpose being had to the accompanying drawings, in which:

FIG. 1 is a longitudinal sectional view through an illustrative form of the invention;
FIG. 2 is a section taken on line 2—2 of FIG. 1.

In the drawings, a taper box coupling member is designated generally by numeral 90 and a correspondingly tapered pin coupling member by numeral 91.

A vibration generator apparatus is designated generally by numeral 92. It includes a longitudinally split body 93, formed to surround the box coupling member 90, and to provide a chamber 93a therearound, and made up of parts 94 and 95 having mating flanges 96 and 97, adapted to be connected by releasable clamp devices 98, whereby the body 93 may be tightly assembled about the coupling member 90. The body parts 94 and 95 are packed to the coupling member 90 as by means of O-ring seals 99.

Body part 94 is connected to the adjacent end of a cylindrical housing 100. The housing 100 has a bore 101 extending inwardly from its remote end, and terminating at a shoulder 102, adjacent its near end. Fitted in said bore is a liner sleeve 103. A vibration generator 104 is slidably fitted in liner sleeve 103 and comprises a tubular housing 105 having integral upper end wall 106 and threaded bottom closure wall 107. The vibration generator housing contains a plurality of vertically spaced unbalanced or eccentrically weighted rotors 108, rotatably mounted on faced transverse shafts 109 set into housing 105. The rotors 108 are mounted on shafts 109 by means of suitable bearings such as 110, and are provided about their peripheries with intermeshing spur gears 111, as shown. The spur gear 111 for the uppermost rotor is driven from a pinion 112 on transverse shafts 113 rotatably mounted in the walls of housing 105, and this shaft 113 also carries a bevel pinion 114 driven from bevel gear 115 on the lower end of a shaft 116 journaled in bearings carried by the upper end portion of housing 105. The shaft 116 has a splined connection at 117 with a hollow drive shaft 118 extending from a suitable variable speed electric drive motor 119. This motor may, for example, be an induction motor driven by power at variable frequency delivered by a generator having as a prime mover a variable speed gas engine. In some instances, an ordinary induction motor will have enough "slip" so that it can be driven by a regular 60-cycle source. The motor shaft is journaled below the motor in suitable bearings carried by a transverse wall 120 abutting the upper end of liner sleeve 103, and above the motor by a bushing mounted in a transverse wall 121, the motor being axially positioned by suitable spacer sleeves as shown. The upper end of housing 100 is closed by a cap 123, and a cable 124 containing the necessary motor leads is led out through this cap as shown.

The lower end wall of housing 105 carries a downwardly extending plunger rod 125 which is fitted for reciprocation within a bore 126 formed in the lower end portion of housing 100. A coil compression spring 127 is confined in housing 100 between shoulder 102 and the bottom of vibration generator housing 105 and yieldingly supports it normally in the position illustrated.

The chamber 93a inside body 93, and extending upwards through bore 126 to the bottom of plunger 125, is filled with a suitable liquid, such as oil, a suitable filler opening being provided, as indicated at 130. A second opening 131 permits escape of air while the chamber is being filled with the liquid. These openings are normally closed by screw plugs, as indicated.

Returning to a consideration of the vibration generator 104, the unbalanced rotors 108, which are driven from the electric motor through the described gear train, are so phased with relation to one another that all of their unbalanced or eccentric weight portions move up and down in synchronism with one another. The result is that the vertical components of force owing to rotating of the unbalanced rotors are in phase an additive, the resultant vertically directed alternating force being transmitted to the generator housing 105 through the mounting shafts 109, causing the housing to oscillate longitudinally. This cyclic force is transmitted from housing 105 to the plunger 125, and thence to the liquid body in chamber 93a. In the illustrated embodiment, there are four of the unbalanced rotors 108, and these are so geared that two rotors turn in one direction and two turn in the opposite direction. Lateral components of force generated by these rotors are, therefore, balanced out.

In operation, the generator 104 thus applies a vertically directed alternating force to the liquid body within chamber 93a. When this force is in the downward direction, the housing 105 moves downward against the supporting influence of spring 127, and its plunger 125, moving against the liquid body in chamber 93a, delivers a compressive pulse thereto. On the other half cycle, the generator housing moves upward, its plunger 125 then creating a negative pressure condition within the liquid body in the chamber 93a. In this upstroke, the mass of the vibration generator housing prevents it from being overthrown in the upward direction, but to assure controlled operation between predetermined limits, an additional coil spring 132, placed between wall 120 and the upper end of the generator housing, can be used if desired.

Alternating compressions and rarefactions are thus applied to the liquid body within the chamber 93a, and these travel as sound waves in the liquid medium throughout the chamber. Corresponding alternating compressions and rarefactions are exerted on the outside of the box coupling member 90. A vibration generator of the type illustrated is capable of very powerful force application, and correspondingly powerful acoustic waves are thus generated and transmitted through the liquid body surrounding the coupling member 90, and exert correspondingly powerful alternating contractive and expansive forces on the latter. The box coupling member 90 is thereupon set into alternating elastic contractive and dilational vibration. By proper speed regulation of the electric drive motor, the vibrations may be made to occur at a frequency near or coinciding with the resonant frequency of the box coupling member 90, thereby causing the vibration amplitude of the box coupling to be considerably amplified.

The box coupling member is thus alternately subjected to contractive and expansive forces, and especially when these run in the resonant range, the amplitude of the dilational movements become quite material. By forcing the pin and box coupling members together during the dilational vibration of the box member, the two coupling members are readily telescoped to such an extent that when the vibrational action is terminated, the box coupling member seizes tightly onto the pin coupling member, and a solid joint is accomplished.

FIG. 1 also shows a limit switch 160, positioned to be engaged and actuated by the tapered pin coupling member when driven a predetermined depth into the box coupling member. This limit switch can control the equipment, not shown, used for forcing the coupling members together while the box coupling member is expanded. By such a provision, there is assurance that the box joint will not be overstressed, expanded beyond its elastic limit, or possibly even split.

It will be understood that the drawings and descriptions are merely illustrative of a present preferred embodiment of the invention, and that various changes may be incorporated without departing from the scope of the invention.

This application is a division of my parent application Serial No. 678,905, filed August 19, 1957, now Patent No. 3,063,143, entitled Shaft Joining Method and Apparatus.

I claim:

The method of coupling the taper pin and taper members of a threadless taper pin and box shaft coupling joint, that comprises: introducing said taper pin member into said taper box member, cyclically elastically expanding said taper box member by subjecting it exteriorly to a pulsating fluid pressure, and simultaneously therewith forcing said members together.

References Cited in the file of this patent

UNITED STATES PATENTS

| | | |
|---|---|---|
| 529,194 | Richter | Nov. 13, 1894 |
| 2,086,667 | Fletcher | July 13, 1937 |
| 2,089,790 | Halpern | Aug. 10, 1937 |
| 2,671,949 | Welton | Mar. 16, 1954 |
| 2,948,059 | Bodine | Aug. 9, 1960 |
| 2,994,516 | Pelkowski | Aug. 1, 1961 |